Dec. 30, 1941.　　　　H. A. BROWN　　　　2,268,016
TROLLEY SWITCH CONTROL SYSTEM
Original Filed Sept. 15, 1939

INVENTOR
HENRY A. BROWN
BY　*John L. Milton*
ATTORNEY

Patented Dec. 30, 1941

2,268,016

UNITED STATES PATENT OFFICE 2,268,016

TROLLEY SWITCH CONTROL SYSTEM

Henry A. Brown, Cleveland, Ohio, assignor to The Cheatham Electric Switching Device Co., Incorporated, Louisville, Ky.

Substituted for abandoned application Serial No. 294,995, September 15, 1939. This application July 15, 1940, Serial No. 345,649

2 Claims. (Cl. 246—227)

My invention relates to electrically operated track switches actuated by current controlled by apparatus responsive to an approaching trolley car and has particular reference to trolley systems supplying current to dirigible and track vehicles which receive current from a common trolley wire.

This application is a substitute for my abandoned application, Serial No. 294,995, filed Sept. 15, 1939.

With the addition of trackless trolley coaches to existing electric street car systems, a negative trolley conductor has been installed adjacent the standard positive trolley conductor. At locations having diverging or turn out tracks and a track switch, it is and has been standard practice to employ electric track point throwing devices embodying the principle of "power on" and "power off" for selecting the route for the street car. Heretofore, when the trolley coach passed through the track switch operating trolley contactor drawing power, the positive trolley shoe sets the track switch point for the turn out or curve track as was done by the street car. In the event a street car had immediately preceded the coach and set the switch point for the straight track by passing through the contactor without drawing power, a serious complication, and often disaster resulted. Since this throwing of the switch point, for the turn out route by the coach could take place immediately after the front wheels of the street car has passed over the switch point and before the rear wheels has passed thereover, the front wheels would necessarily take the straight course and the rear wheels the turn out course thereby derailing the street car, unless the car was traveling very slowly and the motorman thereof was fortunate enough to stop his car before an accident developed. Instances of this kind usually result in serious damage to the car, track, switch and passengers, and in some instances to other vehicles and the occupants thereof. The latter phase of such an accident has happened when another vehicle happened to be in the path of the rear end of the street car as it abruptly departed from the straight through course. Therefore, an object of this invention is to provide an electrically operated track switch controlling device for use by street cars and trolley coaches wherein the trolley coach cannot operate the switch point, thus preventing derailment of an immediately preceding trolley car, under any condition, and without interfering with the normal operation of the trolley coach.

Another object of my invention is to provide apparatus, auxiliary to the regular track switch point actuating equipment, for withholding useless operations of same when the positive current collector of the dirigible vehicle engages the contactor or trolley pan of said switch point actuating equipment.

This and other objects of my invention are disclosed in the selected embodiments of my invention, in which—

Figures 1 and 2 show the system before and after operation by a trolley coach has passed therethrough.

Figure 1:
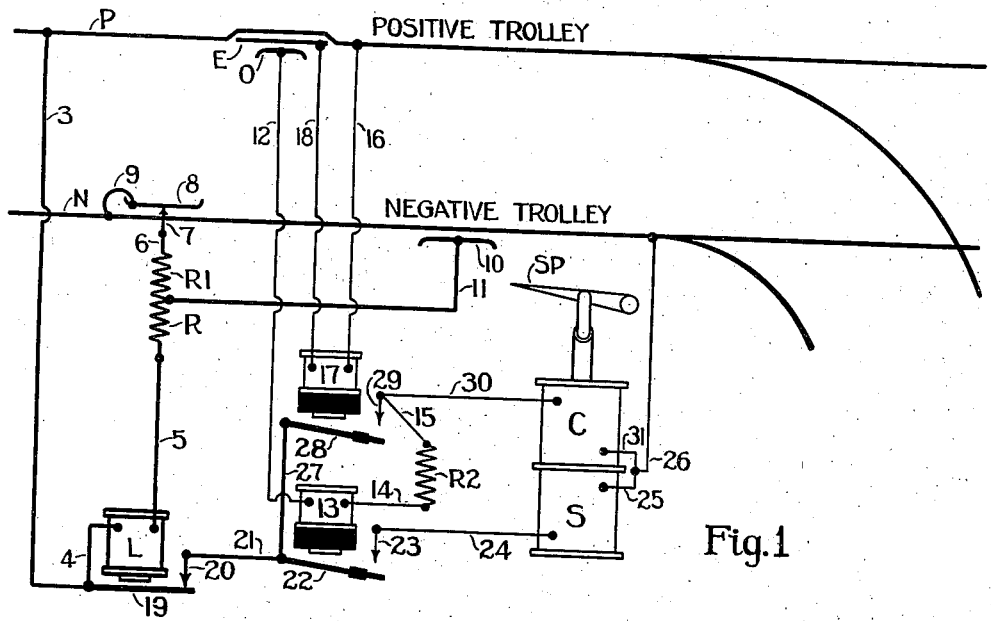
Figure 1 is a schematic drawing showing the relation of electro-mechanical parts and circuits when the system is in normal or inactive condition.
Figure 2:
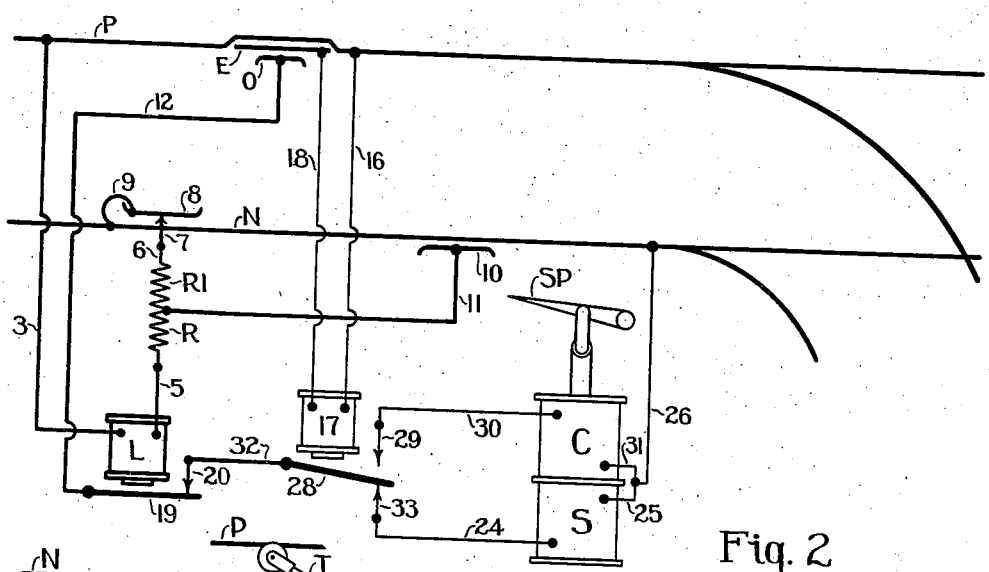
Fig. 2 is a schematic drawing of another system to which my invention is applied. This is a modification of Fig. 1.
Figure 3:
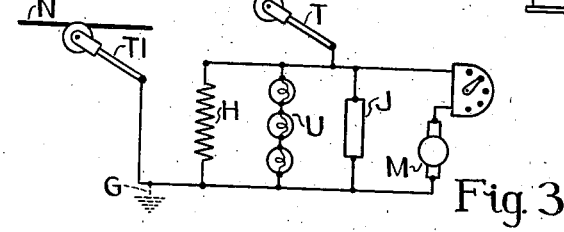
Fig. 3 is a schematic diagram to represent the conventional circuit and electrical apparatus carried by trolley vehicles.

In Figures 1 and 2 the positive (P) and negative (N) wires are shown disposed in parallel relation to indicate an overhead installation suitable for engagement with the single trolley collector of a track vehicle and/or the engagement by two independent trolley conductors carried by a dirigible vehicle.

From the positive conductor in Fig. 1, wires 3 and 4 connect the solenoid L of the controlling relay while conductors 5, 6, contact 7, contactor strip 8 and wire 9 connect solenoid L through two resistor sections R, R1, with the negative conductor. The whole resistor being of a value sufficient to reduce the current flow so that the tractive power of solenoid L will be insufficient to raise armature 19 from the open position, however, sufficient to function as a holding coil after the armature has been picked up. Thus, it will be noted, the negative trolley collector of a dirigible vehicle, when traveling from left to right, first engages contactor strip 8 and thereby interrupts the current flowing to solenoid L. This drops armature 19, which will remain in such state until the said trolley collector has engaged the strip 10 of the second normally open contactor. Since the switch point operating current flows from the positive trolley conductor through wire 3, armature 19, contact 20, wires 21, 27 and either armature 22 or 28, contacts 23, 29, wires 24, 30, respectively, according to conditions hereinafter explained, the operation of the track switch point operated by winding S or C will be interrupted upon contactor strip 8 being separated from contact 7. This circuit will remain interrupted until the negative trolley collector engages contactor strip 10, which momentarily establishes a circuit and supplies "pick up" current for solenoid L through wire 11, resistor R and wires 5, 4 and 3 to P. The picking up of armature 19 re-establishes the switch point operating circuit and prepares the switch point operating system for operation as adverted to above.

Therefore it will be perceived that, since the negative collector opens the switch point operating circuit in advance of the positive collector engaging the co-related track switch operating contactor, the dirigible vehicle is powerless to operate the switch point operating apparatus, thus. consummating the objective of this invention.

As the trolley collector of the track vehicle traverses the positive trolley conductor from left to right with power on, armature 28 will be picked up upon engagement with contactor strip E. This connects a coarse solenoid 17 in series with motor M through wires 16, 18, trolley pole T to ground G or negative potential. During the period that this collector is in contact with strip E current flows to solenoid C and moves track switch point SP for passage to the curve or turn-out route. Obviously, the circuit will be interrupted and the armature dropped to the normal position when the collector has passed from strip E to the trolley conductor. When the said collector engages strip E with power off, even though current is being drawn for auxiliary equipment on the car such as lights U, heaters H and/or air compressor J, the solenoid will not have sufficient tractive power to raise the armature by reason of the selected winding having insufficient ampere turns under the recited conditions. As the said collector engages contact strip O, solenoid 13 of the lower shunt relay 13 will be energized through wires 12, 14, resistor R2, wires 15, 30, solenoid C, wires 31, 26 which are connected to the ground G or negative potential. Completion of this circuit raises armature 22 for engagement with contact 23 which causes current to flow through solenoid S, wires 25, 26 to ground G, or negative potential, thereby moving track switch point SP for passage on the straight line track. The flow of current through this circuit is also interrupted as the collector returns to the conductor wire.

Full details of the switch point throwing mechanism indicated in the drawing have not been included in this disclosure as the device is thoroughly understood in the street railway industry and is a subject of many patents, it being regarded as unnecessary material, since this disclosure is directed to the invention and objects presented at the outset of this specification and the claims appended herewith.

The overall operations incident to the use of the equipment shown in Fig. 2 is the same as Fig. 1, however, some of the details differ. A single series selector relay equipped with solenoid 17, substantially the same as the component part in Fig. 1, is similarly connected to the positive trolley and the contactor strip E through wires 16 and 18 respectively. This relay selects either solenoid C or S of the switch point operating magnet according to whether motor operating current is being drawn through the trolley collector. When current is being drawn for the car to travel the turn out route, armature 28 is raised into engagement with contact 29, whereas armature remains engaged with contact 33 when the car "coasts" through the positive wire contactor. It should be noted that solenoid L is actuated as in Fig. 1 and that armature 28 is supplied with switch point operating current through wire 32, contact 20, armature 19, wire 12, contactor strip O, which is connected to the positive wire by the trolley collector. Just prior to the energizing of contactor strip O, which is connected to the positive wire by the trolley collector, the trolley collector has engaged contactor strip E which selects either solenoid C or S as explained hereinbefore. Armature 19 is subject to the same control by the negative trackless trolley collector engaging and traversing the negative trolley, as explained in terms of the preceding figure.

For the want of a better name, the device for applying current to auxiliary apparatus in response to the passage of a trolley collector (wheel or shoe) and equipped with strips E, O, as identified in the street railway industry as a "trolley pan" or "trolley conductor." This device adjacent the positive trolley conductor is of the normally open type and the similar one adjacent the negative trolley conductor having movable strip 8 and stationary contact 7 is of the normally closed type; these devices can be designated as "trolley switch" or "trolley contactor switch."

I claim:

1. In a trolley-vehicle system having a positive and a negative trolley wire, and a main track-rail electrically connected to the said negative trolley wire, for operating dirigible trackless-trolley buses using two current collectors each respectively engaging said trolley wires, and street cars operating upon the said track-rail and using one collector engaging the said positive trolley wire, the said system including, in combination, a turnout in the main-track rail having a movable tongue for directing street cars either along the main track rail or from the main rail onto the said turn-out; mechanism operatively associated with the said switch tongue for operating the same to one or the other of its operable positions; a first contactor switch disposed adjacent the said positive trolley wire and longitudinally in advance of the said turnout, the said first contactor switch adapted to be actuated by the collector of either a bus or a street car in engagement with the said positive trolley wire as the respective collector passes the said first contactor switch; control means operatively associated with the said first contactor switch and the said mechanism, and adapted to be operated in response to an actuation of the said first contactor switch, for selectively operating the said mechanism, thereby to operate selectively the said tongue to one or the other of its operable positions; a second contactor switch positioned adjacent the negative trolley wire longitudinally in advance of the said first contactor switch, and adapted to be actuated by the collector of a bus engaging the said negative trolley wire as the respective collector passes the said second contactor switch, the longitudinal positioning of the said second contactor switch relative to the said first contactor switch being such that the said second contactor switch is actuated by the collector of a bus engaging the negative wire before the collector of the bus engaging the positive wire actuates the said first contactor switch; means operatively associated with the said second contactor switch and the said control means, and operating in response to an actuation of the said second contactor switch, for rendering the said control means ineffective to actuations of the said first contactor switch; a third contactor switch positioned adjacent the said negative trolley wire longitudinally beyond the said first contactor switch, and adapted to be actuated by the collector of the bus engaging the said negative trolley wire as the respective collector passes the said third contactor switch, the longitudinal positioning of the said third contactor switch relative to the said first contactor switch being such that the said third contactor switch is actuated by the collector of the bus engaging the negative wire after the collector engaging the positive wire passes beyond the said first contactor switch; and means operatively associated with the third contactor switch and the latter mentioned means, and operating in response to an actuation of the said third contactor switch, for rendering the said control means effective to subsequent actuations of the said first mentioned contactor switch by a collector of a street car engaging the said positive trolley wire.

2. In a trolley-vehicle system having a positive and a negative trolley wire, and a main track-rail electrically connected to the said negative trolley wire, for operating dirigible trackless-trolley buses using two current collectors each respectively engaging said trolley wires, and street cars operating upon the said track-rail and using one collector engaging the said positive trolley wire, the said system including, in combination, a turnout in the main-track rail having a movable tongue for directing street cars either along the main track rail or from the main rail onto the said turn-out; mechanism operatively associated with the said tongue for operating the same; a contactor switch located adjacent the said positive trolley wire and longitudinally in advance of the said turn-out, the said contactor switch adapted to be actuated by the collector of either a bus or a street car in engagement with the said positive trolley wire as the respective collector passes the said contactor switch; control means operatively associated with the said contactor switch and the said mechanism, and adapted to be operated in response to an actuation of the said contactor switch, for operating the said mechanism; switch means located adjacent the said negative trolley wire longitudinally in advance of the said contactor switch and adapted to be actuated by the collector of the bus engaging the negative trolley wire as the respective collector passes the said switch means, the longitudinal positioning of the said switch means relative to the said contactor switch being such that the said switch means is actuated by the collector of the bus engaging the negative wire before the collector of the bus engaging the positive wire actuates the said contactor switch; means operatively associated with the said switch means and the said control means, and operating in response to an actuation of the said switch means, for rendering the said control means ineffective to the actuation of the said contact device as the collector of the bus engaging the positive wire passes the said contact device; restoring means operatively associated with the latter mentioned means for rendering the same effective to subsequent actuations of the said contactor switch by a collector of a street car engaging the said positive trolley wire; and means for actuating the said restoring means.

HENRY A. BROWN.